(12) United States Patent
Daude et al.

(10) Patent No.: US 7,574,738 B2
(45) Date of Patent: Aug. 11, 2009

(54) VIRTUAL PRIVATE NETWORK CROSSOVERS BASED ON CERTIFICATES

(75) Inventors: Olivier Daude, Nice (FR); Jacques Fieschi, Biot (FR); Claude Galand, Saint-Paul (FR); Olivier Hericourt, La Gaude (FR); Jean-Francois Le Pennec, Nice (FR)

(73) Assignee: AT&T Intellectual Property II, L.P., Reno, NV (US)

( * ) Notice: Subject to any disclaimer, the term of this patent is extended or adjusted under 35 U.S.C. 154(b) by 722 days.

(21) Appl. No.: 10/288,574

(22) Filed: Nov. 6, 2002

(65) Prior Publication Data

US 2004/0088542 A1    May 6, 2004

(51) Int. Cl.
*G06F 15/16* (2006.01)
(52) U.S. Cl. .......................... 726/15; 713/153; 713/161; 713/168; 713/170; 370/401; 709/238
(58) Field of Classification Search .................. 726/15, 726/11–14; 370/401; 709/225, 229, 237, 709/238; 713/156, 169, 168, 175, 153, 170, 713/161
See application file for complete search history.

(56) References Cited

U.S. PATENT DOCUMENTS

| | | |
|---|---|---|
| 5,745,701 A | 4/1998 | Nguyen-Thai et al. |
| 5,825,891 A | 10/1998 | Levesque et al. |
| 5,835,726 A | 11/1998 | Shwed et al. |
| 5,940,591 A | 8/1999 | Boyle et al. |
| 5,983,350 A | 11/1999 | Minear et al. |
| 6,006,259 A | 12/1999 | Adelman et al. |
| 6,038,322 A | 3/2000 | Harkins |

(Continued)

FOREIGN PATENT DOCUMENTS

EP    1 093 255 A1    4/2001

(Continued)

OTHER PUBLICATIONS

Hunt, "PKI and Digital Certification Infrastructure", Dept. of Computer Science, University of Canterbury, New Zealand, IEEE, 2001, pp. 234-239.*

(Continued)

*Primary Examiner*—Tongoc Tran

(57) ABSTRACT

A method and system for enabling interconnection of VPNs is disclosed. An interconnection device manages an interconnection process at one or more facilities including, for example, a gateway device. The gateway device has information relating to a plurality of VPNs, and may facilitate interconnection between devices on at least two of the VPNs by determining that one device is in fact a member of a first one of the VPNs, and by forwarding connection parameters of the first VPN to the second VPN on an as-needed basis. In this way, the gateway allows interconnection without the need for a completely centralized decision-making process, and does so independently of the type of device and/or VPN(s) being used. Moreover, the gateway may implement only those VPN parameters needed by both VPNs to communicate with one another with a desired level of security, thereby simplifying the routing and forwarding processes associated with the actual communication occurring via the interconnection. The information related to the plurality of VPNs and their respective member devices may be stored in a mapping table at the gateway, and identification parameters of a device seeking interconnection and/or associated VPN parameters may be verified by the use of digital certificates.

37 Claims, 6 Drawing Sheets

U.S. PATENT DOCUMENTS

| | | | |
|---|---|---|---|
| 6,049,878 | A | 4/2000 | Caronni et al. |
| 6,055,236 | A | 4/2000 | Nessett et al. |
| 6,078,953 | A | 6/2000 | Vaid et al. |
| 6,079,020 | A * | 6/2000 | Liu .............................. 726/15 |
| 6,091,820 | A | 7/2000 | Aziz |
| 6,092,200 | A | 7/2000 | Muniyappa et al. |
| 6,105,027 | A | 8/2000 | Schneider et al. |
| 6,182,226 | B1 | 1/2001 | Reid et al. |
| 6,195,751 | B1 | 2/2001 | Caronni et al. |
| 6,226,751 | B1 | 5/2001 | Arrow et al. |
| 6,253,321 | B1 | 6/2001 | Nikander et al. |
| 6,269,099 | B1 * | 7/2001 | Borella et al. ............... 370/389 |
| 6,275,588 | B1 | 8/2001 | Videcrantz et al. |
| 6,289,382 | B1 | 9/2001 | Bowman-Amuah |
| 6,304,973 | B1 | 10/2001 | Williams |
| 6,330,562 | B1 | 12/2001 | Boden et al. |
| 6,332,163 | B1 | 12/2001 | Bowman-Amuah |
| 6,353,886 | B1 * | 3/2002 | Howard et al. .............. 713/156 |
| 6,496,867 | B1 | 12/2002 | Beser et al. |
| 6,636,898 | B1 | 10/2003 | Ludovici et al. |
| 6,662,221 | B1 | 12/2003 | Gonda et al. |
| 6,697,354 | B1 | 2/2004 | Borella et al. |
| 6,826,684 | B1 | 11/2004 | Fink et al. |
| 6,883,100 | B1 | 4/2005 | Elley et al. |
| 6,931,529 | B2 * | 8/2005 | Kunzinger .................. 713/153 |
| 6,938,155 | B2 | 8/2005 | D'Sa et al. |
| 6,954,790 | B2 * | 10/2005 | Forslow ...................... 709/227 |
| 6,976,177 | B2 * | 12/2005 | Ahonen ...................... 713/153 |
| 7,003,662 | B2 * | 2/2006 | Genty et al. ................. 713/158 |
| 7,028,335 | B1 * | 4/2006 | Borella et al. ................ 726/11 |
| 7,054,319 | B2 * | 5/2006 | Akahane et al. ........ 370/395.53 |
| 2001/0009025 | A1 | 7/2001 | Ahonen |
| 2001/0020273 | A1 * | 9/2001 | Murakawa .................. 713/201 |
| 2001/0023443 | A1 * | 9/2001 | Fichou et al. ............... 709/227 |
| 2002/0093915 | A1 | 7/2002 | Larson |
| 2002/0144144 | A1 * | 10/2002 | Weiss et al. ................. 713/201 |
| 2003/0061505 | A1 * | 3/2003 | Sperry et al. ................ 713/200 |
| 2003/0069958 | A1 | 4/2003 | Jalava |
| 2003/0135753 | A1 | 7/2003 | Batra et al. |
| 2003/0154259 | A1 | 8/2003 | Lamberton et al. .......... 709/213 |
| 2003/0191843 | A1 * | 10/2003 | Balissat et al. .............. 709/227 |
| 2003/0191937 | A1 | 10/2003 | Balissat et al. |
| 2004/0066747 | A1 * | 4/2004 | Jorgensen et al. ........... 370/241 |
| 2004/0093492 | A1 * | 5/2004 | Daude et al. ................ 713/156 |
| 2005/0088977 | A1 * | 4/2005 | Roch et al. .................. 370/254 |

FOREIGN PATENT DOCUMENTS

| | | |
|---|---|---|
| WO | 99/67930 | 12/1999 |
| WO | 00/19678 | 4/2000 |
| WO | WO 01/16766 A1 | 3/2001 |

OTHER PUBLICATIONS

Younglove, "Public Key Infrastructure: How it works", Computing & Control Engineering Journal, Apr. 2001.*

De Clercq, J., Paridaens, O., Krywaniuk, A., and Wang, C., An Architecture for Provider Provisioned CE-based Virtual Private Networks using IPsec [online], Jun. 2002 [retrieved on Dec. 1, 2004]. Retrieved from the Interent: <URL: http://www.ietf.org/proceedings/02jul/I-D/draft-ietf-ppvpn-ce-based-02.txt>.

Jeremy de Clercq et al.: "Provider Provisioned CE-based Virtual Private Networks using IPsec" (Network Working Group Internet Draft) <http://www.ietf.rg/proceedings/02jul/I-D/draft-ietf-ppvpn-ce-based-02-txt>, XP002284910, Jun. 2002 (retrieved by EPO examiner on Jun. 17, 2004).

* cited by examiner

| VPN | INTERFACE | SUBNET LIST | ROUTING | FILTERING |
|---|---|---|---|---|
| VPND | INTFD | 194.200.6.0/24 | VR1 : Static | Rules set D |
| VPNE | INTFE | 32.0.0.0/8 | VR2 : BGP | Rules set E |
| VPNF | INTFF | 9.12.0.0/16 | VR3 : OSPF | Rules set F |

FIG4

A CERTIFICATE

VIRTUAL PRIVATE NETWORK CROSSOVERS BASED ON CERTIFICATES

BACKGROUND OF THE INVENTION

1. Field of the Invention

The present invention relates to the formation and use of secure network connections. More specifically, the present invention relates to forming secure network connections for devices located within different private networks.

2. Description of the Related Art

Virtual Private Networks ("VPNs") exist which enable private communications among devices associated with a given VPN, even if some or all of the communications are transmitted over a public network. Most VPNs are broken down into categories that reside in different layers of the well-known Transmission Control Protocol/Internet Protocol (TCP/IP) protocol suite. In particular, the Network and Link Layers of the TCP/IP protocol suite (i.e., layers 3 and 2, respectively) are examples of layers commonly used to establish VPNs.

With respect to Network-Layer VPNs, there are several known methods for construction of such VPNs. As a first example, "route filtering" can be implemented to control route propagation such that only certain networks receive routes for other networks within their own community of interest (i.e., VPN).

Route filtering is based on the proposition that some network subset of an underlying IP network supporting the VPN (such as the Internet) actually forms the VPN. Routes associated with this network subset are filtered such that they are not announced to any other network(s) connected to the network subset forming the VPN. Conversely, no other non-VPN route is announced to the network subset.

Privacy of services on a network-layer, route filtering VPN is implemented by restricting any of the VPN hosts from responding to packets which contain source addresses from outside the VPN. Such restrictions are based on access control lists ("ACLs"), which are tables that tell a device which access rights each user has. That is, an ACL is a list of entries that grant or deny specific access rights to individuals or groups.

Conventional network-layer, route filtering VPNs, however, have various difficulties associated therewith. For example, such an arrangement can be misconfigured such that it erroneously accepts packets which it should not, and/or rejects packets that should be accepted. Another problem with route filtering is that, when implemented behind a gateway or firewall device, subscriber networks can define a router external to the gateway/firewall as the default router, so that users of the VPN behind the gateway/firewall can reach external networks as long as they know the default router address (even if it is not advertised). Additional shortcomings of this technique include administrative mistakes, a static nature of the design and limitations on the security provided. In addition, the complexity for defining and maintaining all the rules is very high, so that the technique does not scale very well or very easily.

As a final point related to network-layer, route-filtering VPNs, connection between two different VPNs (i.e., inter-VPN connectivity) requires the network to route externally-originated packets to the VPN interconnection point. If the packets are admitted into the VPN at the interconnection point, the same packets may be passed back across the network to the ultimate VPN destination address. Thus, this interconnection point is a very sensitive point in the security design of interconnected VPNs.

A second type of network-layer VPN is built using tunneling protocols. Generic Routing Encapsulation (GRE) is a network-layer tunneling protocol used to construct VPNs (Layer 2 tunnelling protocols, such as Layer 2 Tunnelling Protocol (L2TP) and Point-to-Point Tunnelling Protocol (PPTP) are also known and are discussed in more detail below).

GRE tunnels are configured between a source (ingress) router and a destination (egress) router, such that packets designated to be forwarded across the tunnel are further encapsulated with a new header (the GRE header), and placed into the tunnel with a destination address of the tunnel endpoint (the new next-hop). When the packet reaches the tunnel endpoint, the GRE header is stripped away, and the packet continues to be forwarded to the destination, as designated in the original IP packet header.

In the GRE tunnelling protocol, routing for the VPN is isolated from routing of the customer. The VPNs can reuse the same private address space within multiple VPNs without any cross impact, providing considerable independence of the VPN from the customer network.

Various difficulties exist with respect to implementing the GRE tunnelling protocol. For example, GRE tunnels must be manually configured, which leads to excessive administrative overhead. Also, privacy of the network is an area of concern, because the tunnel is still vulnerable such that privacy is not absolute. Additionally, packets that use GRE formatting can be injected into the VPN from third-party sources. Moreover, it is necessary to deploy ingress filters that are aligned to the configured tunnel structure in order to ensure a greater degree of integrity of privacy of the VPN. Finally, it is also necessary to ensure that Customer Premises Equipment (CPE) routers are managed by the VPN service provider, because the configuration of the tunnel end-points is a critical component of the overall architecture of integrity of privacy.

As a final example of a network-layer tunnelling technique, IP Security (IPSec) has been developed. IPSec is a flexible framework for providing network-layer security. Earlier security protocols often protected only a portion of an end-to-end path, or forced the imposition of the same protection everywhere along the path. IPSec, in contrast, provides complete end-to-end network layer security, while giving the opportunity to tailor the security coverage on a segment-by-segment basis along any given path. IPSec protocols support data origin authentication, data integrity, data confidentiality, encryption key management, and management of security associations. Within the IPSec framework, a company can configure secure end-to-end solutions that can accommodate both locally attached users and remote-access users, and can support communications both within the company and between different companies.

IPsec encrypted tunnel mode, nonetheless, still leaves the tunnel ingress and egress points vulnerable, because these points are logically part of the host network as well as being part of the unencrypted VPN network. Any corruption of the operation, or interception of traffic in the clear, at these points will compromise the privacy of the private network. In the tunnel mode, however, traffic that transits the encrypted links between participating routers is considered secure.

In addition to network-layer VPNs, there also exist conventional link-layer VPNs. For example, link-layer protocols such as Frame-Relay or Asynchronous Transfer Mode (ATM) allow building VPNs as a set of Private Virtual Circuits (PVCs). The VPNs built are not generally fully-meshed (i.e., each of the VPN devices is not necessarily capable of communicating directly with all of the other VPN devices). Rather, they are only partially meshed, or use a Hub model. Although robust and simple, these protocols are not easily scalable, since any peer-to-peer connection is a dedicated PVC that needs to be configured manually.

One method of addressing these scaling issues in link-layer VPNs is to use VPN labels within a single routing environment, in the same way that packet labels are necessary to activate the correct per-VPN routing table in network layer VPNs. The use of local label switching effectively creates the architecture of the well-known Multi-protocol Label Switching (MPLS) VPN. The architectural concepts used by MPLS are generic enough to allow it to operate as a peer VPN model for switching technology for a variety of link-layer technologies, and in heterogeneous Layer 2 transmission and switching environments. MPLS requires protocol-based routing functionality in the intermediate devices, and operates by making the transport infrastructure visible to the routing.

MPLS VPNs have not one, but three key ingredients: (1) constrained distribution of routing information as a way to form VPNs and control inter-VPN connectivity; (2) the use of VPN-IDs, and specifically the concatenation of VPN-IDs with IP addresses to turn (potentially) non-unique addresses into unique ones; and (3) the use of label switching (MPLS) to provide forwarding along the routes constructed via (1) and (2).

Numerous approaches are possible to support VPNs within an MPLS environment. In the base MPLS architecture, the label applied to a packet on ingress to the MPLS environment effectively determines the selection of the egress router, as the sequence of label switches defines an edge-to-edge virtual path. The extension to the MPLS local label hop-by-hop architecture is the notion of a per-VPN global identifier, which is used effectively within an edge-to-edge context. This global identifier could be assigned on ingress, and is then used as an index into a per-VPN routing table to determine the initial switch label. On egress from the MPLS environment, the VPN identifier would be used again as an index into a per-VPN global identifier table to undertake next-hop selection.

In another approach to supporting VPNs within an MPLS environment, a Provider Edge (PE) router having a plurality of logical routers is configured such that each logical router corresponding to one VPN can be implemented with an entity of a routing protocol between PE routers whose processing is based on VPN Routing and Forwarding (VRF) tables. Based on the route information of a VRF table in a PE router, user traffic received from a CE (Customer Equipment) device or another PE router is forwarded to another CE device or PE router via an access or logical link respectively. For the dynamic routing service, a PE router distributes route information inside user sites, which is received from a CE device or another PE router, to another CE device or PE router using routing protocol between PE routers. A PE router implements one or more logical (i.e. "virtual") routers. It is usually located at the edge of an SP (Service Provider) network.

Finally, tunneling techniques for link-layer VPNs also exist. For example, Virtual Private Dial Networks (VPDN) exist which use layer 2 tunnelling techniques. There are three principal methods of implementing a VPDN: Layer 2 Tunnelling Protocol (L2TP), Cisco Layer 2 Forwarding protocol (L2F) from which L2TP was derived, and Point-to-Point Tunnelling Protocol (PPTP) tunnels. Such tunnels represent VPNs that can be static or dynamic tunnels with, in some cases, a preliminary authentication phase.

In short, various solutions have been put forward to achieve different levels of network privacy when building VPNs across a shared IP backbone. Many of these solutions require separate, per VPN forwarding capabilities, and make use of IP or MPLS-based tunnels across the backbone. Also, within a VPN domain, an instance of routing is used to distribute VPN reachability information among routers. Any routing protocol can be used, and no VPN-related modifications or extensions are needed to the routing protocol for achieving VPN reachability.

Generally speaking, then, a VPN can take several forms. A VPN can be between two end systems, or it can be between two or more networks. A VPN can be built using tunnels or encryption (at essentially any layer of the protocol stack), or both, or alternatively constructed using MPLS or one of the "virtual router" methods. A VPN can consist of networks connected to a service provider's network by leased lines, Frame Relay, or ATM. As a final example, a VPN can consist of dialup subscribers connecting to centralized services or to other dialup subscribers.

Regardless of which of the above techniques (or other known techniques) is used to form a VPN, it should be understood that network security is a concern. In fact, network security is a concern in many contexts aside from VPNs, and, in general, increasing use of remote access over public networks and Internet access for inter-business communication are major driving forces behind the evolution of security technology. In particular, public-key certificates (discussed in more detail below) and dynamic passwords are two technology areas that are growing rapidly to meet the security needs of today's networked environment. In the VPN arena, these security technologies are well-used in VPNs based on IPsec, but are not as advantageous when used in conjunction with other VPN technologies.

Many techniques for network security revolve around the use of a firewall, which is generally known as a combination of hardware and software used to implement a security policy governing network traffic between two or more networks, some of which may be under administrative control (e.g., organizational networks) and some of which may not be under administrative control (e.g., the Internet). A network firewall commonly serves as a primary line of defense against external threats to an organization's computer systems, networks, and critical information. Firewalls can also be used to partition networks or isolate/interconnect VPNs. Firewalls use various decision-making processes, such as packet filtering, application proxies and dynamic filtering (stateful inspection), to filter out undesirable packets from entering/exiting the protected network. Such decision-making processes are discussed in more detail below.

In addition to these security-related filtering functions, firewalls can also perform routing functions that are associated with the network being protected and that are conventionally associated with a separate/individual router. Routing is the process of deciding the disposition of each packet that a routing device handles. This applies to incoming packets, outbound packets leaving a network for external destinations, and packets being routed among internal networks. Ultimately, there can be only two dispositions of packets: forward or discard. The routing mechanism decides between these two using the destination IP address in the packet header. This decision process is governed by a data structure called the routing table.

A firewall system's routing configuration reflects its view of the topological configuration of the networks to which it is attached. A routing configuration that reflects the network topology is generally used so that the firewall will be able to deliver legitimate packets to their desired destinations. Most firewall systems' routing configurations rarely change, and are static. The static nature of the routing configurations stems from the fact that routing topology changes may create conflicts between routing and filtering policies for certain filter rules.

Each network to which a firewall system is attached has a procedure to obtain new IP addresses. For the Internet, this is obtained from the Internet Service Provider (ISP) that connects to the firewall. For internal networks, a dedicated IP address should be given from within the organization. If dynamic IP addresses are used, additional authentication techniques may be required, as is known.

A firewall system's routing table contains a list of IP network addresses for which the firewall system is intended to provide routing services. Each row of the table describes one network. The index used to access a row in the table is the destination network address of the packet currently being routed. If table lookup is successful, the table provides either the address of the next router to which to send the packet or the interface to use to send the packet out. That next router is used as the intermediate destination and the packet is forwarded there. If the table lookup fails, the packet is discarded. An Internet Control Message Protocol (ICMP) "unreachable" message may be returned to the source indicating that the packet was undeliverable.

Regardless of the routing technique used, the routing mechanism is usually not used to implement security policy. That is, a routing mechanism is often considered too dynamic and unreliable to perform security functions. Routing functions and supporting structures are primarily designed to route packets efficiently and reliably, not securely. Therefore, filtering techniques that can be implemented in connection with operation of a firewall (and/or router) for security purposes exist, and examples of these (as referred to above) are packet filtering, application proxies, and dynamic filtering (stateful inspection).

Packet filtering on routers is used to allow, to the extent possible, only authorized network traffic. Packet filters specify packets to filter (discard) during the routing process. These filtering decisions are usually based on contents of the individual packet headers (e.g., source address, destination address, protocol, port). Some packet filter implementations offer filtering capabilities based on other information; these implementations are discussed in more detail in connection with stateful inspection described below.

Generally speaking, packet filtering routers offer the highest performance firewall mechanism. However, they are harder to configure because they are configured at a lower level, requiring a detailed understanding of protocols.

Packet filtering is the process of deciding the disposition of each packet that can possibly pass through a router with packet filtering. For simplicity's sake, it can be assumed that there are only two dispositions: accept and reject. IP filtering provides the basic protection mechanism for a routing firewall host, allowing a determination of what traffic passes through based on the contents of the packet, thereby potentially limiting access to each of the networks controlled by the firewall router.

The criteria used in each filtering rule for determining the disposition can be arbitrarily complex. For a router with packet filtering, there may be multiple points in the routing process where the rules are applied; typically, for arriving packets, they are applied at the time a packet is received and, for departing packets, they are applied immediately before a packet is transmitted. There may be different rule sets at each point where filtering is applied. If the entire security policy can be implemented in packet filters, then other firewall mechanisms may not be required. If some elements of the filtering policy cannot be implemented with packet filters, then additional firewall mechanisms such as proxies may be necessary.

An application proxy is an application program that runs on a firewall system between two networks. The firewall host on which the proxy runs does not necessarily need to be acting as a router. When a client program establishes a connection "through" a proxy to a destination service, it first establishes a connection directly to the proxy server program. The client then negotiates with the proxy server to have the proxy establish a connection on behalf of the client between the proxy and the destination service. If successful, there are then two connections in place: one between the client and the proxy server and another between the proxy server and the destination service. Once established, the proxy then receives and forwards traffic bi-directionally between the client and service. The proxy makes all connection-establishment and packet-forwarding decisions; any routing functions that are active on the host system are generally irrelevant to the proxy.

As a final example of a security technique for operation in a firewall router, the terms stateful inspection or dynamic packet filtering refer to a more capable set of filtering functions on routers. Packet filtering is generally restricted to making its filtering decisions based only on the header information on each individual packet without considering any prior packets. Stateful inspection filtering allows both complex combinations of payload (message content) and context established by prior packets to influence filtering decisions. As with packet filtering, stateful inspection is implemented as an "add-on" to routing.

The principle motivation for stateful inspection is a compromise between performance and security. As a routing "add-on," stateful inspection provides much better performance than proxies. It also provides an increase in the level of firewall function beyond simple packet filtering. Like proxies, much more complex access control criteria can be specified and like packet filtering, stateful inspection depends on a high quality (i.e., correct) underlying routing implementation.

Generally speaking, there are good reasons to use packet filtering, application proxies and/or stateful inspection, depending on the situation and needs of a particular user. For example, certain services (e.g., Simple Mail Transfer Protocol (SMTP), Hypertext Transfer Protocol (HTTP), or Network Time Protocol (NTP)) are usually safe to control via packet filters while others (e.g., Domain Name System (DNS), File Transfer Protocol (FTP)) may require the more complex features available only in proxies. Packet filtering is fast, while application proxies are generally slower. In cases where greater access control is required and the poorer performance of proxies cannot be tolerated, stateful inspection packet filters may be an acceptable compromise. In any case, if possible, it is advantageous to have as many of these different functions (i.e., packet filters, proxies, and stateful inspection) available as possible, applying each where appropriate.

Although there are many techniques for implementing and securing individual VPNs, as discussed above, there is an additional need for VPNs which can cross-communicate without sacrificing service to their users, e.g., without reducing the security of transmissions between the two (or more) VPNs or within a particular one of the VPNs.

In considering the difficulties associated with interconnecting multiple VPNs, then, it should be considered that a VPN is generally built to solve some common problems. These problems include, for example, virtualization of services and segregation of communications to a closed community of interest. Thus, when two different networks using the same or different VPN technologies are interconnected, the VPN Networks interconnecting function must respect at least the following principles: security of network operations, maintenance of network integrity, interoperability of services and data protection. Issues that arise from these principles include: scalability, complexity, security, cost of deployment and management.

Security, which can be implemented in various forms as already discussed, generally means preventing the hacking of packets, which may be snooped on, modified in transit, or subjected to traffic analysis by unauthorized parties. Additionally, security refers to avoiding misconfiguration errors that provide holes between two or more VPNs.

In inter-connecting different VPNs, whether a given VPN is behind a firewall device or not, some centralized VPN management tools enable secure connectivity between multiple customers and multiple services over a single connection, with flexible, centralized management and control. They simplify secure interconnection and management of networks with incompatible routing or address conflicts. They are generally limited to the type of equipment used and vendor. Such VPNs are centralized and have no secure feedback.

Such centralized configuration VPN systems allow the setting of network policies involving hardware devices, as well as user registration functions to set network policies and privileges. These conventional systems are based on what is known as an Access Control List ("ACL").

ACL-based management systems essentially manage ACLs that are residing in routers that control traffic flow and provide some level of security of access. They can also perform the monitoring of user activity to determine when users are connected and where they're mapped, from a policy standpoint, to virtual LANs in the network. ACLs allow administrators to define security and traffic control policies for management across devices, according to the controlling company, and are also commonly used for securing Internet access. ACLs can be centrally managed through a template library. Access list configurations can be managed for groups of users and for devices and network services used in VPNs.

Conventional solutions for inter-connecting VPNs, especially non-centrally managed conventional solutions, are lacking in regards to global crosschecking of devices, support of any type of device being interconnected and interconnection with other tools such as security tools.

In addition, even if a VPN inter-connection technique is centralized, such conventional configurations use the same technology, i.e., ACLs that are downloaded to each device in the network. Thus, conventional ACL-based VPN solutions can be used for interconnections management only if the same tool is working on both types of VPNs being interconnected. Therefore, at least some manual ACL settings generally need to be implemented if a non-compatible protocol or piece of equipment is used.

Moreover, the centralized ACL configuration is static, and does not lend itself to automation. If another configuration tool is used, or a manual modification is performed by a user that has been granted access (or by a user who has mistakenly or illicitly gained access), there is no direct verification of the user and/or system done to check for errors or other problems.

An ACL may also take the form of a filtering statement in firewalls, but continue to use the same mechanism described above. Sometimes several similar rules are duplicated in cascaded equipments because there is a lack in confidence in what has been defined in other devices. ACL use has a high computing resources and performance impact on all devices, so that any simplification would improve network performance noticeably.

As a final point related to conventional techniques for cross-connecting devices on different VPNs, it is possible for administrators of, for example, a firewall router to maintain tables for managing the VPNs and cross-connections therebetween. However, such techniques are only workable for static configurations of VPNs, that is, the VPN(s) much be reconfigured and reset before a new transmission path can take place between the two VPNs. Therefore, these techniques are slow to implement, and are not easily scaleable. Moreover, such conventional techniques require knowledge of customer parameters by the administrator(s), and therefore may fail to maintain a desired level of privacy and security on the part of the VPN customer(s).

In short, no conventional approach currently exists which permits interconnection of VPNs in a secure, efficient, scaleable, reliable, dynamic and decentralized manner.

SUMMARY OF THE INVENTION

The present invention enables interconnection of VPNs, according to one embodiment, by management of an interconnection process at one or more facilities including, for example, a firewall or gateway device. The firewall or gateway device has information relating to a plurality of VPNs, and may facilitate interconnection between devices on at least two of the VPNs by determining that one device is in fact a member of a first VPN, and by forwarding connection parameters of the first VPN to the second VPN on an as-needed basis. In this way, the firewall, gateway or other similar device allows interconnection without the need for a completely centralized decision-making process, independently of the type of device and/or VPN(s) being used. Moreover, the firewall, gateway or similar device may implement only those VPN parameters needed by both VPNs to communicate with one another with a desired level of security, thereby simplifying the routing and forwarding processes associated with the actual communication occurring via the interconnection. The information related to the plurality of VPNs and their respective member devices may be stored in a mapping table at the firewall, gateway or similar device, and identification parameters of a device seeking interconnection and/or associated VPN parameters may be verified by the use of digital certificates.

According to a first embodiment of the invention, a method is disclosed for permitting a first device on a Virtual Private Network (VPN) to communicate with a second device outside the VPN. The method may include authentication, at an interconnection device, of the first device as a member of the VPN. The method may further include identification, at the interconnection device, of VPN parameters related to connecting and forwarding characteristics of the VPN. Finally, the method may include the forwarding of data from the first device to the second device via the VPN and the interconnection device, where the forwarding operation is based on the VPN parameters.

According to a second embodiment of the invention, a method is disclosed for forwarding communications from a first device on a Virtual Private Network (VPN) to a second device via an interconnection device. The method may include the receipt of identification information from the first device at a filtering and forwarding engine within the interconnection device, the forwarding of the identification information to a control subsystem within the interconnection device, and the authentication of the first device as a member of the VPN by verifying, at the control subsystem, VPN parameters associated with the VPN. The method may further include provision of the VPN parameters to the filtering and forwarding engine, as well as the forwarding of the communications from the first device to the second device via the filtering and forwarding engine and in accordance with the VPN parameters.

According to a third embodiment of the invention, an interconnection device for allowing communications between a first device on a Virtual Private Network (VPN) and a second device not on the VPN is disclosed. Such an interconnection device might include a mapping table containing VPN information describing operations of the VPN, a filtering and forwarding engine operable to receive identification information related to the first device, and a control subsystem operable to authenticate the first device based on the identification information, the control subsystem further operable to modify the VPN information within the mapping table such that the filtering and forwarding engine transmits the communications from the first device to the second device in accordance therewith.

According to a fourth embodiment of the invention, an article of manufacture having a computer readable medium having stored therein a computer program carrying out a method for connecting a first device on a Virtual Private Network (VPN) to a second device not on the VPN is disclosed. Such a computer program might include a first code segment for receiving an authentication request from the first device, a second code segment for authenticating the first device as a member of the VPN, in response to the authentication request, and a third code segment for determining routing and forwarding parameters associated with intra-VPN data traffic. Finally, such a computer program might also include a fourth code segment, for implementing the routing and forwarding parameters with respect to communications between the first device and the second device.

According to a fifth embodiment of the invention, a system for cross-connecting a first device on a first Virtual Private Network (VPN) to a second device on a second VPN is disclosed. Such a system might include an identification subsystem operable to identify the first device and the second device, and to output identification information accordingly. The system might further include an authentication subsystem operable to receive the identification information and authenticate the first device and the second device as members of the first VPN and the second VPN, respectively, based thereon, and to output authentication information accordingly. Such authentication information might include a first set of rules governing data transmission over the first VPN and a second set of rules governing transmission over the second VPN. Finally, such a system might include a matching subsystem operable to receive the authentication information and match the first set of rules to the second set of rules such that secure transmission occurs between the first and second devices via the first and second VPNs.

According to a sixth embodiment of the invention, a method is disclosed for connecting a first device on a first Virtual Private Network (VPN) to a second device on a second VPN. Such a method might include receipt of a first certificate identifying properties of the first device and the first VPN at an interconnection device, as well as receipt of a second certificate identifying properties of the second device and the second VPN at the interconnection device. Thus, the interconnection device may operate to compare the first and second certificates and store information related to a predetermined number of VPNs of which the first and second VPNs are a subset, thereby allowing interconnection of the first and second devices based on the comparing operation.

Finally, according to a seventh embodiment of the invention, a system is disclosed for connecting a first device on a Virtual Private Network (VPN) to a second device not on the VPN. Such a system may include means for authenticating the first device as a member of the VPN, means for establishing VPN parameters associated with the first VPN, and means for transmitting communications between the first device and the second device, based on the VPN parameters.

The features and advantages of the invention will become apparent from the following drawings and description.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 4 demonstrates a VPN mapping table according to one embodiment of the invention.

DETAILED DESCRIPTION

Figure 1:
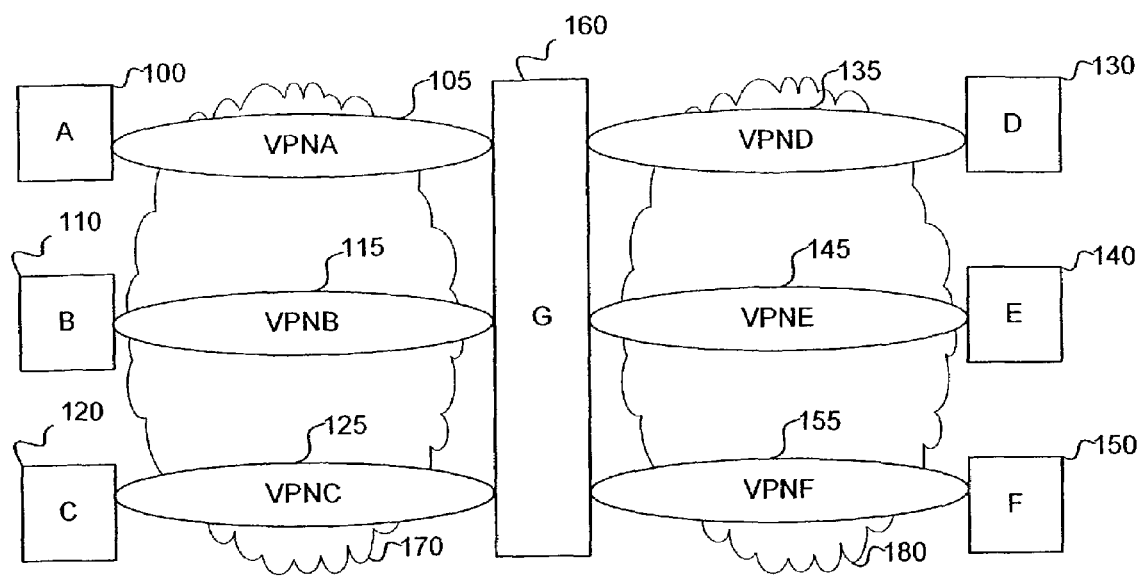
FIG. 1 is a schematic view of a networking environment illustrating one embodiment of the present invention.

While the present invention is described below with respect to various exemplary embodiments, the present invention is not limited to only those embodiments that are disclosed. Other embodiments can be implemented by those skilled in the art without departing from the spirit and scope of the present invention.

The present invention, according to one embodiment, provides an interconnection device, containing a VPN mapping table, that utilizes specially-constructed certificates to identify VPN properties of the user and/or device being connected and compares these properties to another VPN. According to this embodiment, the interconnection device is capable of automatically allowing VPN interconnections, without a need for a centralized decision-making process. The interconnection device implements whichever VPN rules from one or both of the interconnecting VPNs are necessary for secure interconnection. Moreover, this embodiment of the invention is independent of the types of devices and types of VPN technologies being used.

In one embodiment, then, the present invention facilitates secure interconnection between a VPN on which certificates have been built to identify VPN properties of the user or device being connected and another VPN on which certificates have also been built to identify VPN properties of the user or device being connected. Certificates comparison and match analysis by the interconnection device allows (or disallows) the VPNs to exchange data and routes.

One embodiment of the invention related to these techniques for interconnection is to define and build specific Certificates fields within device or user certificates for performing interconnection of VPNs. A VPN mapping table stored in the interconnection device may represent all the VPNs of a defined network. In addition, one embodiment of the present invention proposes an apparatus optimizing such methods for building an interconnection gateway.

The present invention thus provides a global solution that is not linked directly with the type of device nor the VPN technology used, but that nonetheless gives a very secure identity of each VPN when an interconnection has to be performed. The device which performs the interconnection may decide and allow automatically, without central control or reconfiguration of the VPN interconnection, adding of the required rules associated with both VPNs' rules defined for VPN entry points. The use of digital certificates in one embodiment of the invention allows easy deployment of the invention. The present invention ensures a high security level that can be used for configuration, including filtering and routing rules in the gateway and security management, thus integrating the different network management tools.

Although the present invention is discussed primarily in terms of cross-connecting separate devices on separate VPNs, it should be understood that only one device need be on a VPN for the invention to be useful. The other device need not be on a separate VPN, and can be, for example, a gateway, firewall or similar interconnection device.

Because the present invention enables dynamic updating of VPN characteristics, including the ability for cross-connections, it is considerably faster and more scaleable than conventional prior art systems. Moreover, the present invention enables VPN customers to create or modify parameters of their VPNs, perhaps by creating or modifying their own digital certificate(s). In this way, customers have greater flexibility and ease in managing their VPN(s). In one embodiment of the invention, certain such parameters can be maintained such that only the customer(s) can create or modify certain parameters, and VPN administrators are restricted from altering these parameters.

Having described embodiments of the invention in general terms, the following discussion and related figures set forth particular embodiments in more detail.

FIG. 1 is a simplified representation of two networks 170 and 180 being interconnected through Gateway 160 (which, as would be obvious to one of ordinary skill in the art, may also be a firewall device and/or have various routing functionalities). Each network transports several Virtual Private Networks (VPNs) that may correspond to different customers' networks sharing the same infrastructure owned by a service provider.

In this example, three VPNs 105, 115 and 125 are represented over network 170 with only one remote device being connected over each VPN. It should be understood that, generally, a plurality of devices may be connected on each VPN, however, since the described embodiment handles each device separately, a single device per VPN is enough to clearly explain the process. The three remote devices represented on network 170 are: device 100 connected to Gateway 160 through VPN 105, device 110 connected to Gateway 160 through VPN 115 and device 120 connected to Gateway 160 through VPN 125. Similarly, over the second network 180, three remote devices are also connected to Gateway 160: device 130 through VPN 135, device 140 through VPN 145 and device 150 through VPN 155.

In FIG. 1, it is assumed that each VPN has a different name as an identification parameter. However, this assumption is meant to be illustrative and not limiting. For example, a global customer virtual private network may include both VPN 125 on network 170 and VPN 155 on network 180, or VPN 115 and VPN 125 on network 170 and VPN 155 on network 180. In other words, virtually any combination is possible, and the use of different names/reference numerals herein is merely to clearly identify a VPN connection. Thus, a VPN identifier may be built of different fields, if preferred, representing the customer global VPN, the network on which the VPN is established, and/or the connection for this VPN.

Between each VPN, possible interconnection is established thanks to VPN parameters that can be either preloaded or dynamically loaded. The VPN parameters will define routing and filtering rules applied to the flows exchanged between the connected end devices. End devices (100, 110, 120, 130, 140 and 150) may be Hosts, routing devices, gateways or any other device known to be connectable to Gateway 160 through a VPN over a network such as network 170 or 180.

Figure 2:
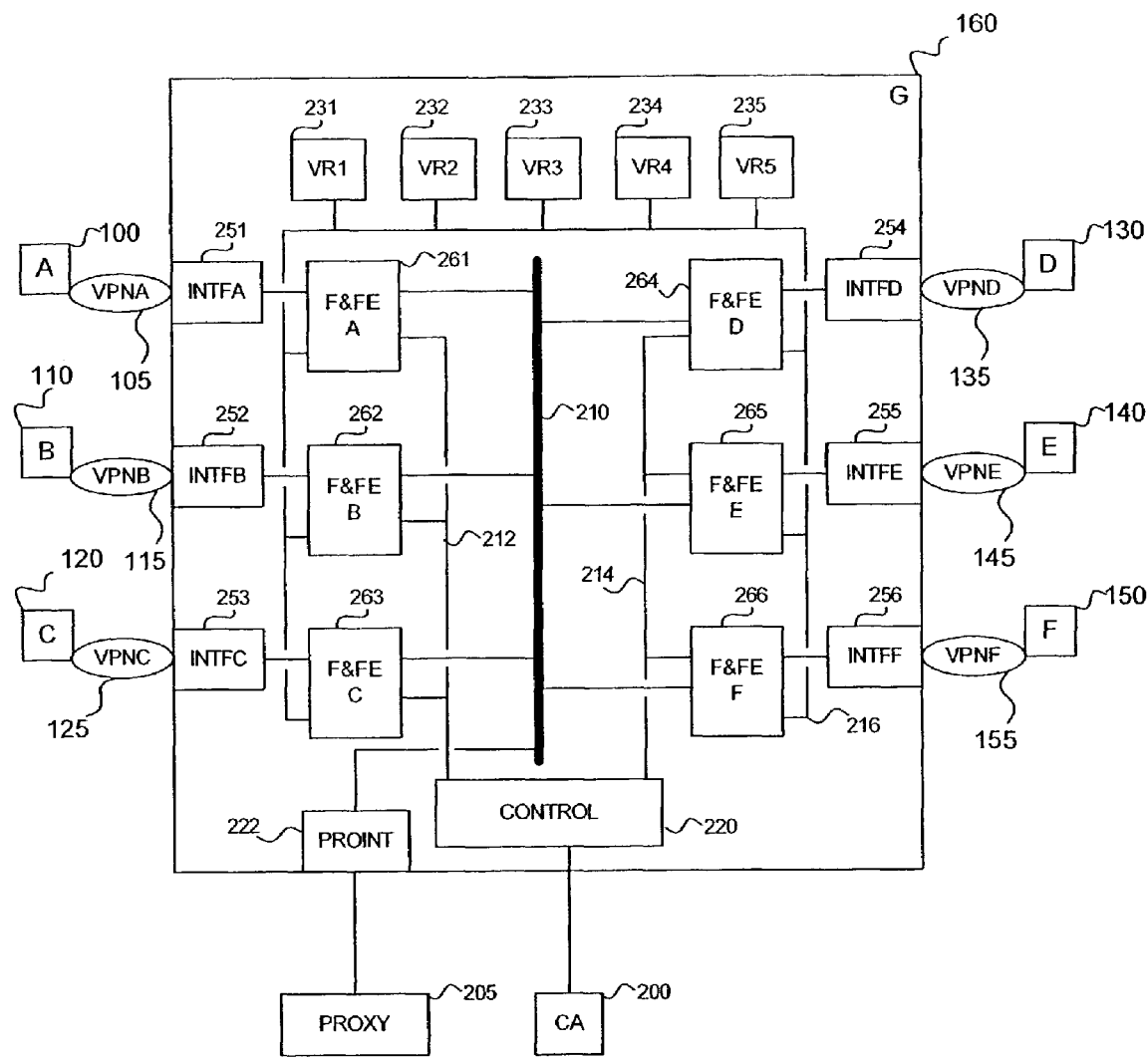
FIG. 2 shows internal gateway functions and external devices involved in a hardware representation of one embodiment of the present invention.

FIG. 2 represents the functions involved in Gateway 160 with external connectivity to remote devices as described in FIG. 1, as well as connection to other devices including Certificate Authority (CA) 200 and PROXY server 205. These two devices will be described in more detail in FIG. 3, however, they represent standard well-known devices. In general, the Certificate Authority 200 stores digital certificates for the purpose of secure device VPN identification. The proxy server 205 is used for implementing the application proxy technique, as discussed above.

Neither component 200 or 205 is located on networks 170 or 180, for security reasons. Rather, they are preferably connected on a local network or a dedicated connection. It is possible to put components 200 and 205 on a data network (if the network is considered secure enough), or to connect them though a secured encrypted connection.

Certificate Authority 200, as is known and referred to above, processes digital certificates for implementing secure network connections such as VPNs. A Certificate is a structure that contains a public value (i.e., a public key) that is bound to an identity. Within a specific type of Certificate, such as the X.509 Certificate, the public key may be bound to a "user's name". The CA 200 attests that the public key belongs to the user, so that when a client receives a certificate from another user the "strength" of the binding between the public key and identity can vary depending on the reliability of the particular CA 200 being used.

An X.509 Certificate in particular has a very formal structure in some respects, yet maintains a degree of flexibility in other respects. Those elements that are always contained in a certificate are as follows:

Subject This is the "user's name" referred to above, although the subject field can in fact be any identity value. A number of name spaces are supported. The default is X.500 Distinguished Names (e.g., c=GB, o=Integrity, cn=hughes). Alternative name spaces supported include RFC822 e-mail addresses (e.g. johnh@entegrity.com).

Issuer This is the name of the Third Party that issued/generated the certificate, that is, the Certificate Authority 200. The same name spaces are used as defined for the Subject field.

Public Value This is the public key component of a public/private key pair. An associated field defines the public key algorithm being used, for instance whether it is an RSA, Diffie-Hellman or DSA public key.

Validity Two fields are used to define when the certificate is valid from and valid to. Combined together these provide the validity period.

Serial Number This is a field that provides a unique certificate serial number for the issuer of the certificate.

Signature This is how the Subject identity and the Public Value are bound together. The signature is a digital signature generated by the CA 200 over the whole certificate, using the CA's private key. By having signed the certificate the CA "certifies" that the Subject is the "owner" of the public key and therefore has the corresponding private key.

X.509 Version 3 ("V3") is a version of X.509 certificates that adds an extensibility mechanism to the original X.509 certificate format. Certificate extensions can be defined in standard fields or by user communities. Some examples of certificate extensions are: alternative name forms, key identifiers, key usage, subject attributes, certificate policies and constraints.

Additional specific extensions may also be built. As will be discussed in more detail below, one embodiment of the present invention contemplates the integration of extensions for VPN identification and related rules, whereby interconnection can take advantage of the security provided by digital certificates.

In FIG. 2, each device connected to Gateway 160 uses a dedicated termination point, which can be an interface or a logical sub-interface such as a Private Virtual Circuit (PVC) or tunnel termination point. More specifically in the example of FIG. 2, devices 100, 110, 120, 130, 140 and 150 connected respectively through VPNs 105, 115, 125, 135, 145 and 155 terminate their connections in interface blocks INTFA 251, INTFB 252, INTFC 253, INTFD 254, INTFE 255, INTFF 256, also respectively.

At these termination points, the low layers (e.g., layers 1 and 2) are removed from the packets to reveal the IP frame. The frame could be a pure IP packet from a host, or could be an encapsulated IP packet in the case of, for example, GRE or IPsec tunnelling. The IP packet received on an interface is sent from the interface block (251-256) to the connected function blocks referred to herein as Filtering and Forwarding Engines F&FE 261, 262, 263, 264, 265 and 266. F&FEs 261-266 may be used in part to implement, for example, packet filtering as discussed above.

Packet information includes, for example, packet header information (e.g., source address, destination address, protocol, source port, destination port, packet length, connection state information) as well as packet payload (e.g., message content). Some or all of this information may be referenced in filter rules depending on the actual implementation of the packet filter mechanism in the F&FE blocks.

F&FEs 261-266 thus have several functions. For example, they identify the packet, and, as they implement an IP forwarding function, they can forward or filter any known packet (according to input and output rules).

When a newly-connected device establishes communications with an F&FE block (or in other instances when filtering/forwarding rules are not defined), the F&FE block attempts to identify the IP device which is trying to establish a connection. This can be done using an IP source address found on an incoming packet, by a broadcast on the link or by using an alternate identification like user authentication. It may also be a device without an assigned IP address that is requesting one for the purposes of the connection.

In any of the above-mentioned cases, the remote device must be identified by determining, for example, its IP address, USERID, name or other such parameters. Using this information, F&FE block (e.g., F&FEA 261) sends a request to CONTROL Block 220 via lead 212 to return a user certificate or associated VPN certificate from an external CA 200 in order to proceed to authentication of the connecting device.

At this point, a legacy device or user digital certificate may be used. An administrator may implement VPN digital certificates as full certificates including user or device parameters, or may just put a pointer on a legacy device (or user) digital certificate to a specialized digital certificate providing only the VPN parameters. This can be viewed as an indirect or indexed access method to the VPN part of a device certificate. In the description of the embodiment of the invention discussed herein, a common global digital certificate is used that includes both legacy parameters and VPN parameters.

Figure 3:
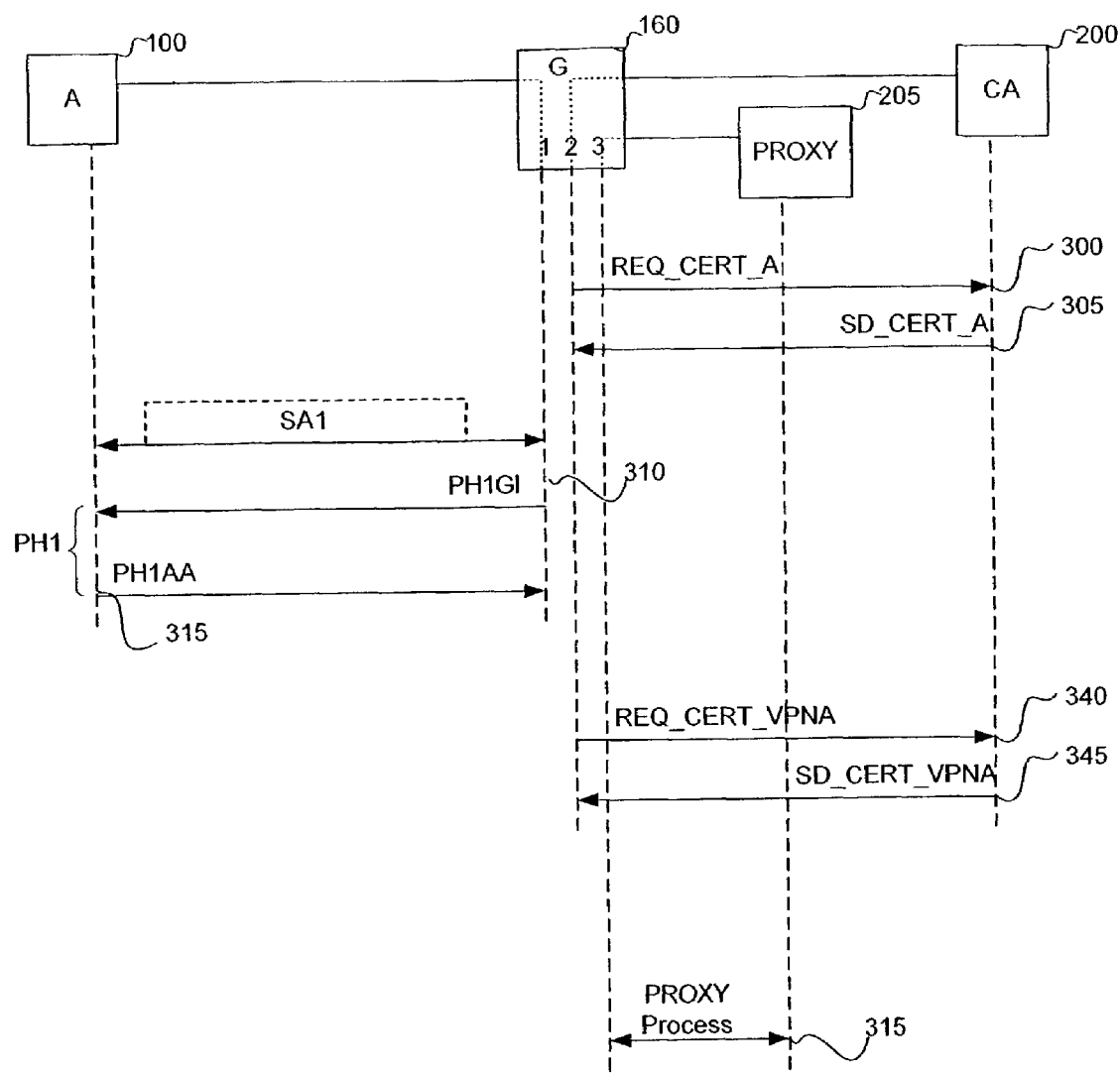
FIG. 3 shows examples of flows that may occur between external devices establishing a VPN connection to an interconnection gateway according to one embodiment of the invention.

The device authentication is done according to the well-known ISAKMP process using a security association established, for example, between device 100 and Control block 220, as described in more detail with respect to FIG. 3. At this point, no traffic coming on VPN 105 is able to pass through Gateway 160 to another VPN, as long as the peer device is not authenticated and the rules are not defined for routing and filtering.

When the connection for VPNA 105 is authenticated, Control block 220 decodes the VPN information included in the VPN certificate corresponding to VPNA 105 and provides at least F&FEA 261 (and possibly other F&FE blocks, as necessary) with the filtering and routing parameters and a pointer to F&FEA 261 block for a Virtual Router negotiation. This is done via leads or set of leads 212 and 214, which can be a serial bus or other conventional type of bus.

It should be noted that the use of a shared bus like 210 for data forwarding, control and routing function is also contemplated by the present invention, but the use of dedicated buses or leads allows the connections shown in FIG. 2 to be considered only as hardware connections. Implementing a shared bus 210, on the other hand, may be done in a pure software environment in a server.

In situations where routing is required between VPNs, a virtual router (routing block) can be shared between these VPNs to build a common routing table. Each VPN sharing this virtual router updates the common table, which can then be viewed as a routing control point. Part of this routing table is then downloaded with regular updates (or upon any change(s)) to the forwarding function of each F&FE 261-266. Each update or download may be different depending on particular routing rules of each VPN. Thus, a set of Virtual Routers can be implemented which are shown in FIG. 2 as VR1 to VR5 231-235.

As an example, F&FEA 261 and F&FED 264 may share a common virtual router VRI 231 in the interconnection of VPNA 105 to VPND 135 (many of the process steps associated with this example are described in more detail with respect to FIGS. 3 and/or 5). The first connected and authenticated VPN requests a Virtual router when the rules associated with that VPN imply that the use thereof is necessary. In this example, F&FED 264 has been assigned VR1 231 prior to a connection of device 100 through VPNA 105.

When the second VPN is connected (in this case, VPNA), a set of control messages are exchanged between F&FEA 261 and F&FED 264, and a pointer to VR1 231 is provided by F&FED 264 to F&FEA 261. A routing table in VR1 may then be updated using routing bus 216 and forwarding functions on each side activated in parallel.

In this example, it is assumed that VPN filtering rules have been set, either from the certificate(s) or from pre-configured values in VPN filtering tables. When in certificates, filtering rules and parameters are converted into statements understood by the Gateway 160, such as access control lists (ACLs, discussed in detail above). In these cases, a single ACL statement can be built up one parameter at a time, with the options to follow at each stage shown in a table.

ACL can work on a Media Access Control (MAC) address, IP address (source/destination), protocol type and port number, or other known parameters. An ACL Statement can be applied to an interface, sub-interface or virtual circuit, tunnel corresponding to the VPN interface defined.

Figure 5:
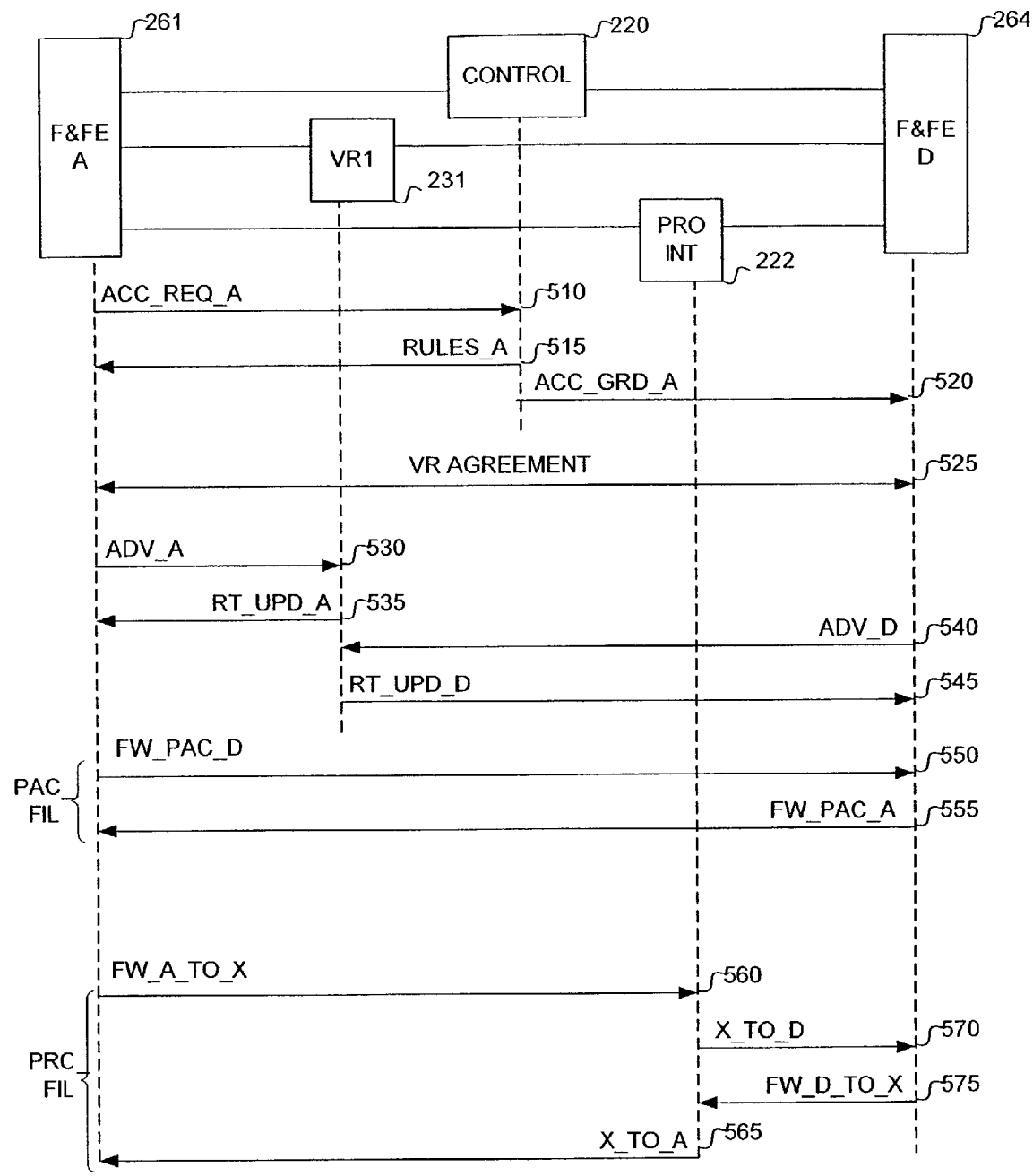
FIG. 5 demonstrates flows that occur between involved internal gateway functions in order to establish the interconnection of two VPNs according to one embodiment of the invention.

Then the data forwarding can start as described in FIG. 5, directly between blocks F&FEA 261 and F&FED 264, via data bus 210. It can be a direct transmission when packet filtering is activated, or packets may be forwarded from F&FEA 261 to PROINT block 222, which is the interface block for the external firewall Proxy function 205. When the proxy application is run, another packet (i.e., a modified version of the packet received from F&FEA 261) is transmitted to F&FED 264.

It should be noted that the gateway design of the example shown in FIG. 2 and discussed above is based on a multiple layer firewall architecture, so that all inbound and outbound packets travel through both outside and inside gateway functions (i.e., the F&FE functions between the external network (Internet) and the internal network(s), and the F&FE functions between the outside gateway and the internal network(s), respectively).

For the outside F&FE function, e.g., F&FEA in the above example, the routing configuration is relatively complex and the packet filtering rules are relatively simple. Thus, formulation of the routing configuration and the filtering rules needs to be done separately and somewhat in sequence. In contrast, for the inside F&FE function, e.g., F&FEB in the above example, the routing configuration is relatively simple and the packet filtering rules are generally more complex. Thus, in this case, routing configuration and filtering rules should be formulated concurrently in the digital certificate. In both inside and outside F&FE functions, it may be necessary to apply rules coming from several VPN digital certificates. In that case rules are added, and if there is a conflict between rules, the most limited and most secure should be implemented. In this latter case, a warning message can be sent to a security administrator for checking.

FIG. 3 describes the external flows between Gateway G 160, remote devices such as device A 100, proxy server 205 and CA 200 according to one embodiment of the invention and corresponding to the example(s) discussed above with respect to FIG. 2.

In FIG. 3, the use of two certificates is illustrated. One certificate is used to establish the peer device identity, and a second certificate is used to identify the corresponding VPN. As described in FIG. 2, when a new VPN is detected, the IP peer device thereon is detected and authenticated. Specifically, the device identification certificate is obtained by a request 300 to CA 200 (i.e., REQ_CERT_A), and the certificate is provided to Gateway 160 in operation 305 (SD_CERT_A).

In FIG. 3, it is assumed that IPsec is used as at least one basis for VPN security. Accordingly, a Security Association (SA) phase one is initiated by gateway G (as is conventional and well-known). The SA phase 1 set of messages 310 are sent from Gateway 160 at address G1 to device A 100 which answers with message(s) PH1AA 315. These messages are generally intended to protect further negotiation traffic by way of, for example, the "Main mode" portion of an SA phase 1 exchange. As is known, the Main mode is designed to provide protection for the identity of the involved devices. It is typically divided into three sets of messages, each set containing two messages. The first two messages are used for negotiating a security policy for the exchange, the next two messages are used for a Diffie-Hellman keying material exchange and the last two messages are used for authenticating the peers, such as with digital signatures and optional additional digital certificates.

The option of providing additional digital certificates at this point may be a secure option allowing Gateway 160 to get VPN digital certificates from CA 200 only after a successful mutual authentication between Gateway 160 and device 100 has occurred. In this case, device 100 will provide Gateway 160 with either a pointer to the certificate or a key to decode/decrypt the related VPN digital certificate.

It should be noted that, while a digital certificate is not generally something that should be protected, as it includes mainly public values, some fields related to VPN certificates, such as IP addresses, subnets values and filtering rules, should not be disclosed. Therefore such VPN certificate should be transported through a secure path. Thus, in the example of FIG. 3, device 100 may prefer to protect the pertinent certificate and to allow access to it only to authenticated devices.

Assuming the mutual authentication of device 100 and Gateway 160 is satisfactorily completed, Gateway 160 will request a VPN certificate check of CA 200 using a request message 340 (REQ_CERT_VPN_A), and CA 200 will answer with a message (or set of messages) 345 containing the certificate (SD_CERT_VPNA).

The certificate may be decrypted using a secret key given by device 100 in the previous SA negotiation, or a more complex mechanism may be implemented, such as device 100 providing CA 200 with the encryption public key of Gateway 160, or device 100 granting permission to CA 200 to provide Gateway 160 with its VPN certificate. Gateway 160 and CA 200 may also start an SA between themselves (in order to build a secure IPsec communication), or may use Secure Socket Layer (SSL) or other secure protocol for the certificate download.

Finally in FIG. 3, an external connection 315 to a proxy gateway server 205, which is optional depending on needed filtering rules, can be used for some or all the traffic between the interconnected VPNs.

FIG. 4 represents a VPN mapping table for a network according to one embodiment of the invention. Such a table utilizes parameters defined in a certificate from devices such as device 100 together with information from/about Gateway 160 to formulate information helpful in interconnecting VPNs. Generally, each VPN table corresponds to a given network, such as network 170 or network 180. If the Gateway 160 manages more than one network using tables, then one table per network may be implemented. Examples of fields per table, as shown in row 400, are a VPN identifier, the Gateway interface (or set of interfaces if common) on which this VPN is active, corresponding routing and/or filtering parameters/rules and lists of subnets for which the rules are defined.

In one embodiment of the invention, a "deny" is automatically applied to all undefined subnets. Routing parameters include which virtual router manages the routing function for this VPN and the type and parameters for this routing function. In the filtering field of row 400, firewall rules to apply on the F&FE managing the VPN in question are defined.

In another embodiment of the invention, a main table may be used to provide a pointer for each field pointing to another table or file. Such a table may be especially useful in cases were each field might contain a large number of values.

In one example, network 180 may use this table structure and the three VPNs 135, 145 and 155 belonging to network 180 may each have a dedicated row 410, 420 and 430, on the mapping table, respectively. In FIG. 4, VPND 135 in row 410 uses interface INTFD 254, and device 130 handles subnet 194.200.6.0. In general, each device may handle a different network, or a global statement may be defined for a group or for all devices.

Grouping subnets can improve the filtering performance in minimizing the number of rules to apply. For example, a local virtual router for VPND 135 may be VR1 and routes are shown in FIG. 4 as static for this VPN, so that the list of routes can be given explicitly in this field. A rules set D is defined which may include incoming and outgoing rules as commonly used in Gateway 160.

Similarly, VPNE 145 is defined on row 420 using a different interface (INTFE 255), a different subnet list, a different protocol for routing and a different set of rules. Even if the routing protocol happens to be the same, another instance of that protocol must be used if run on a separate virtual router. In some cases a common Virtual Router may be used by several VPNs running over the same network, but even in that case, the naming for each VPN is different (since the filtering rules provide a differentiation between these VPNs). Similarly, two VPNs may have similar filtering rules but still may need to be separated and managed independently.

Finally with respect to the rows of FIG. 4, VPNF 155 row 430 represents a third independent VPN on a different interface (INTFF 256), having different subnets, using another virtual router and protocol, and another dedicated set of firewall rules.

In one embodiment of the invention, certain parameters within the mapping table of FIG. 4 can only be created or modified by the VPN customers, and can not by altered by an administrator of Gateway 160. For example, according to this embodiment of the invention, a mapping table may be stored in control block 220 in a form that is read-only to an administrator of Gateway 160, but that is writable by VPN customers.

It may be simpler for some types of networks running static VPNs to use only the mapping table of FIG. 4, instead of certificates. For example, if the Gateway 160 belongs to the network, there are may be no security issues to require setting of the VPN routing and filtering parameters directly on the Gateway 160.

In such a scenario, a backbone VPN such as an MPLS network can have VPNs defined for all the customers. Moreover, in such a scenario, changes do not occur very often (typically only where there is a new customer to be attached or a major change in existing customer infrastructure). Thus, only external connections from the Internet, other external networks, on-demand connections, or DSL connections typically require authentication and dynamic interconnection. In such cases, the VPN mapping is with one F&FE entity using certificates and one F&FE entity using a locally-stored VPN table.

FIG. 5 represents the message and packet flows between functional blocks within Gateway 160. The message/packet flows shown in FIG. 5 largely correspond to the hardware description of Gateway 160 operations described above with respect to FIG. 2. The main functional blocks involved when a device on a new VPN (here, device 100 on VPNA 105) is connected through the interconnection gateway are: the relevant Filtering and Forwarding Engine 261, the Filtering and Forwarding Engine(s) (here, only F&FE 264 is needed) on the other VPN(s) with which the new VPN wants to interconnect, the virtual routers of the existing VPNs (e.g., VR1 231) necessary to allow VPNA 105 to join one or more virtual router instances, control block 222 to be used for the VPN connection/authentication/certificate management and (optional) block PROINT 222 used to interface the external proxy server 205 when required by the filtering rules.

When device 100 requests a VPN interconnection, it is connected to a functional block within Gateway 160 called Firewall and Forwarding Engine (F&FEA 261) which, after authentication is requested from Control Block 220 in operation 510 (message ACC_REQ_A), receives rules message 515 (RULES A) corresponding to its entity. Rules message 515 might comprise, for example, a digital certificate containing the rules to implement which certificate is decoded and split into different parts by Control Block 220.

Another set of rules is sent to the pending F&FED block 264 using message 520 (ACC _GRD_A) corresponding to an "access granted to A" message telling F&FED 264 to negotiate with F&FEA 261 the use of a virtual router in process 525 (VR AGREEMENT). Other set of rules may also be provided in a multipoint VPN environment, as needed.

Then, in a route update process, each remote router advertises its routes to the common virtual router using messages like ADV_A 530 and ADV_D 540. Methodologies for such routing updates, by themselves, are conventional and would be obvious to one of ordinary skill in the art. Once the routing updates are completed, the virtual router VR1 231 updates each side (i.e., routers on each VPN) with the routing information required for the interconnection of the VPNs, using messages to F&FEA 261 and F&FED 264 blocks such as RT_UPD_A 535 and RT_UPD_D 545.

Once F&FE functions are fully configured for both routing and filtering on both sides, the data traffic may be accepted and rules will be applied. If an application proxy is not to be used for a data flow, then the process after having applied the filtering rules on F&FEA block 261 is to send the data IP packet encapsulated in a message 550 referred to in FIG. 5 as FW_PAC_D to the remote F&FED block 264. Answer packets or similar flows coming from the remote side will use the same path, but in the opposite direction, and are encapsulated in a message 555 referred to in FIG. 5 as FW_PAC_A.

Alternatively, if an application proxy is used for a data flow, then the process on F&FEA block 261 is to send the data IP packet encapsulated in a message 560 referred to in FIG. 5 as FW_A_to_X to the interface block PROINT 222 managing the external connection with the proxy server 205.

In this latter case, the packet(s) is encapsulated in a low layer protocol such as Ethernet and forwarded to the proxy server 205, which will then apply the policy corresponding to this application. The answer from the proxy server 205 containing the same destination IP address is forwarded to F&FED 264 on a message 570 referred to in FIG. 5 as X_TO_D.

If the destination IP address, in the answer message from the proxy, is not the destination address of the original IP packet but rather the source address, e.g., if the proxy server 205 rejects the packet(s), then the proxy server 205 forwards a rejection message to F&FEA 261 and device 100 in a message X_TO_A 565. Answer packets or similar flows coming from the remote side will use the same path through the proxy server in the opposite direction, and are encapsulated in a messages FW_D_TO_X 575 sent to the proxy server 205 and X_TO_A 565 sent by the proxy server 205 to F&FEA block 261.

From the above discussion, it should be understood that similar process(es) may occur in a peer-to-peer manner between any pair of F&FE blocks as soon as a VPN interconnection is established.

Figure 6:
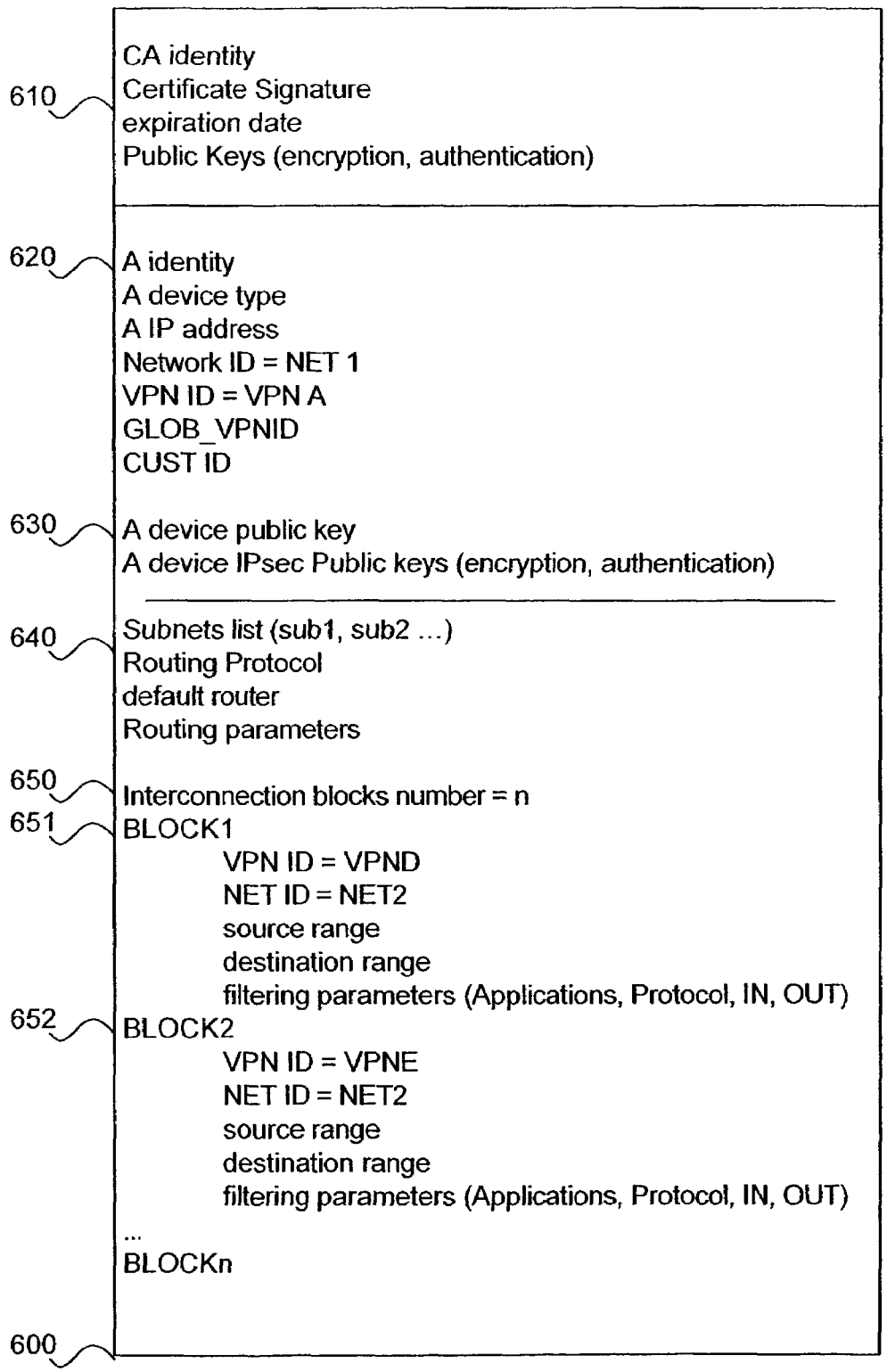
FIG. 6 demonstrates a certificates structure utilized in one embodiment of the invention.

FIG. 6 demonstrates a certificates structure utilized in one embodiment of the invention. As shown in FIG. 6, a portion 610 of certificate 600 may contain the certification authority (CA) 200 identity and signature, as well as the certificate expiration date and CA public keys (for encryption and authentication). A portion 620 may contain various information relating to device 100 having address A, including its identity, device type, IP address, the identification of the network on which this device is connected (i.e., Network 170), the local VPN ID of the connection, the global VPN ID for the customer using this device (which may be common to several devices while each VPN ID is independent per device), and finally a customer id (which may be a customer name or other predetermined id).

Another portion 630 contains the device 100 public key, IPsec authentication public key and IPsec encryption public key. A further portion 640, used when the device 100 is a router or a gateway, contains the list of subnets that have to be managed through the VPN, as well as the routing protocol and associated routing parameters related to this connection (e.g., route distribution, static routes definitions and/or default router).

A parameter 650 gives the number of interconnection blocks (e.g., blocks 251-256 in FIG. 2) being defined for the interconnection. Then each block is set out such as shown in items 651 and 652. That is, each block may contain several parameters, such as VPNID, NETID and GLOB-VPNID, local IP range (source range) to interconnect to the new VPN and finally the IP destination range and filtering parameters associated with this VPN interconnection (including rules for the different applications and protocols that will be allowed/denied in incoming and outgoing traffic).

As explained above, one embodiment of the present invention provides techniques for interconnecting a device on a first VPN to a device on a second VPN, using an interconnection device such as a Gateway or Firewall. The interconnection device serves the functions of identifying and authenticating the device(s), perhaps using a digital certificate associated with the device. The interconnection device may also construct and use a mapping table to assist in interconnecting the two devices operating on separate VPNs. In these ways, devices on separate VPNs can be connected to one another in a secure manner, regardless of the types of devices and VPN techniques being used, and without having to rely on a centralized control process.

While this invention has been described in various explanatory embodiments, other embodiments and variations can be effected by a person of ordinary skill in the art without departing from the scope of the invention.

What is claimed is:

1. A method for permitting a first device on a first Virtual Private Network (VPN) to communicate with a second device on a second VPN, the method comprising:
   automatically authenticating, at an interconnection device without reference to a completely centralized decision making process, the first device on the first VPN;
   automatically identifying, at the interconnection device without reference to a completely centralized decision making process, VPN parameters of the first VPN related to connecting and forwarding characteristics of the first VPN;
   forwarding data from the first device on the first VPN to the second device on the second VPN via the first VPN, the interconnection device and the second VPN, said forwarding step being based on the VPN parameters of the first VPN;
   automatically authenticating, at the interconnection device without reference to a completely centralized decision making process, the second device on the second VPN;
   automatically identifying, at the interconnection device without reference to a completely centralized decision making process, VPN parameters of the second VPN related to connecting and forwarding characteristics of the second VPN;
   reading at least a portion of the VPN parameters of the first VPN and at least a portion of the VPN parameters of the second VPN from a mapping table stored on the interconnection device which contains information related to plural VPNs associated with the interconnection device; and
   forwarding data from the second device on the second VPN to the first device on the first VPN via the second VPN, the interconnection device and the first VPN.

2. The method of claim 1, further comprising:
   selecting parameters from amongst the first and second VPN parameters which provide the most secure transmission of data from the first device to the second device.

3. The method of claim 2, further comprising:
   sharing a virtual router between the first VPN and the second VPN; and
   building a router table common to the first VPN and the second VPN at the virtual router.

4. The method of claim 1, wherein said authenticating of said first device further comprises:
   establishing an identity of the first device based on an Internet Protocol (IP) address of the first device.

5. The method of claim 1, wherein said authenticating of said first device further comprises:
   establishing an identity of the first device based on information provided by a user of the first device.

6. The method of claim 1, wherein the mapping table is read-only with respect to an administrator of the interconnection device.

7. The method of claim 1, further comprising:
   updating the mapping table stored on the interconnection device and containing information related to plural VPNs associated with the interconnection device based on authentication information obtained during the steps of identifying the first and second VPN parameters.

8. The method of claim 1, wherein the first VPN parameters include an identification of a virtual router within the interconnection device used to route the data.

9. The method of claim 1, wherein said authenticating of said first device further comprises:
   requesting a digital certificate from a certification authority based on identification information related to the first device and received therefrom; and
   establishing a security association between the first device and the interconnection device.

10. The method of claim 9, wherein the digital certificate includes VPN parameters defined by a customer of a VPN service provider.

11. The method of claim 9, wherein the digital certificate is associated with the first device.

12. The method of claim 9, wherein the digital certificate is associated with the first VPN.

13. The method of claim 1, wherein the VPN parameters are preloaded at the interconnection device by an administrator of the interconnection device.

14. The method of claim 1, wherein first VPN parameters are dynamically loaded at the interconnection device based on a digital certificate associated with the first device or the first VPN.

15. The method of claim 1, wherein first VPN parameters include packet filtering rules for determining a forwarding status of the data.

16. The method of claim 1, wherein said operation of forwarding data further comprises:

forwarding the data to a proxy server, the proxy server operable to determine a forwarding status of packets associated with the data; and forwarding a copy of the data from the first device to the second device when permitted by the proxy server.

17. A method for forwarding communications between a first device on a first Virtual Private Network (VPN) and a second device on a second VPN via an interconnection device, the method comprising:

receiving first identification information from the first device on the first VPN at a first filtering and forwarding engine within the interconnection device;

forwarding the first identification information to a control subsystem within the interconnection device;

automatically authenticating the first device as a member of the first VPN, the first device authenticating step including automatically verifying, at the control subsystem within the interconnection device without reference to a completely centralized decision making process, first VPN parameters associated with the first VPN;

providing the first VPN parameters to the first filtering and forwarding engine;

forwarding the communications from the first device to the second device via the first filtering and forwarding engine and in accordance with the first VPN parameters;

receiving second identification information from the second device on the second VPN at a second filtering and forwarding engine within the interconnection device;

forwarding the second identification information to the control subsystem within the interconnection device;

automatically authenticating the second device as a member of the second VPN, the second device authenticating step including automatically verifying, at the control subsystem within the interconnection device without reference to a completely centralized decision making process, second VPN parameters associated with the second VPN;

providing the second VPN parameters to the second filtering and forwarding engine;

forwarding further communications from the second device to the first device via the second filtering and forwarding engine and in accordance with the second VPN parameters; and updating the VPN parameters within a mapping table containing VPN parameter categories for each of plural VPNs associated with the interconnection device.

18. The method of claim 17, wherein said first identification information further comprises an Internet Protocol (IP) address of the first device.

19. The method of claim 17, wherein said first identification information further comprises user authentication information entered by a user of the first device.

20. The method of claim 17 wherein said forwarding further comprises:

sending a request from the first filtering and forwarding engine to the control subsystem for a digital certificate;

obtaining the digital certificate from an external certification authority; and extracting at least a subset of the first VPN parameters from the digital certificate.

21. The method of claim 20, wherein the digital certificate includes first VPN parameters defined by a customer leasing the VPN from a carrier.

22. The method of claim 20, further comprising:

establishing a security association between the first device and the interconnection device.

23. The method of claim 17, wherein the second device is the interconnection device.

24. The method of claim 17, wherein the first VPN parameters include routing and filtering rules associated with the first VPN.

25. The method of claim 17, wherein the first VPN parameters include an identification of a virtual router within the interconnection device used to route the data.

26. An interconnection device for allowing communications between a first device on a first Virtual Private Network (VPN) and a second device on a second VPN, the interconnection device comprising:

a mapping table containing VPN information describing operations of the first and second VPNs;

first and second filtering and forwarding engines operable to receive first and second identification information related to the first device on the first VPN and the second device on the second VPN, respectively; and a control subsystem operable to automatically authenticate, without reference to a completely centralized decision making process, the first device on the first VPN and the second device on the second VPN based on the first identification information and the second identification information, respectively, wherein the control subsystem is further operable to automatically identify, without reference to a completely centralized decision making process, first VPN information related to the first device on the first VPN and second VPN information related to the second device on the second VPN, and to modify the first and second VPN information within the mapping table such that the first and second filtering and forwarding engines transmit the communications between the first device on the first VPN to the second device on the second VPN in accordance therewith.

27. The interconnection device of claim 26, further comprising:

a virtual router operable to route the communications between the first device on the first VPN and the second device on the second VPN; and a router table stored on the virtual router that is common to the first VPN and the second VPN.

28. The interconnection device of claim 26, wherein the mapping table is read-only with respect to an administrator of the interconnection device.

29. The interconnection device of claim 26, further comprising:

a virtual router within the interconnection device connected to the filtering and forwarding engines and operable to route the communications.

30. The interconnection device of claim 26, wherein said control subsystem sends a request to a certification authority for a digital certificate, based on the first identification information, and thereafter establishes a security association between the first device and the interconnection device.

31. The interconnection device of claim 26, wherein VPN parameters are preloaded in the mapping table by an administrator of the interconnection device.

32. The interconnection device of claim 26, wherein first VPN parameters are dynamically loaded at the interconnection device based on a digital certificate associated with the first device or the first VPN.

33. The interconnection device of claim 26, wherein the first filtering and forwarding engine implements packet filtering rules for determining a forwarding status of the data, based on the first VPN information.

34. The interconnection device of claim 26, wherein the first filtering and forwarding engine is further operable to forward the communications to a proxy server, the proxy server operable to determine a forwarding status of packets associated with the communications, the first filtering and forwarding engine further operable to forward a copy of the data from the first device to the second device when permitted by the proxy server.

35. An article of manufacture, which comprises a computer readable medium having stored therein a computer program for carrying out a method for connecting a first device on a first Virtual Private Network (VPN) to a second device on a second VPN, the computer program comprising:

a first code segment for receiving first and second authentication requests from the first device on the first VPN and second device on the second VPN, respectively;

a second code segment for automatically authenticating the first device as a member of the first VPN and for automatically authenticating the second device as a member of the second VPN, in response to the first and second authentication requests, respectively, the automatically authenticating steps being performed without reference to a completely centralized decision making process;

a third code segment for automatically determining, without reference to a completely centralized decision making process, parameters associated with intra VPN data traffic including routing and forwarding parameters;

a fourth code segment for implementing the routing and forwarding parameters with respect to communications between the first device and the second device; and a fifth code segment for updating the routing and forwarding parameters within a mapping table implemented by a sixth code segment.

36. The article of manufacture of claim 35, wherein said second code segment further comprises:

a code segment for obtaining a digital certificate from an external certification authority; and a code segment for extracting at least a subset of the routing and forwarding parameters from the digital certificate.

37. The article of manufacture of claim 35, further comprising:

a code segment for routing communications based on the routing and forwarding parameters.

* * * * *